May 22, 1945.  R. C. LAWLOR ET AL  2,376,366
GEOCHEMICAL PROSPECTING SYSTEM
Filed June 17, 1940   3 Sheets-Sheet 1
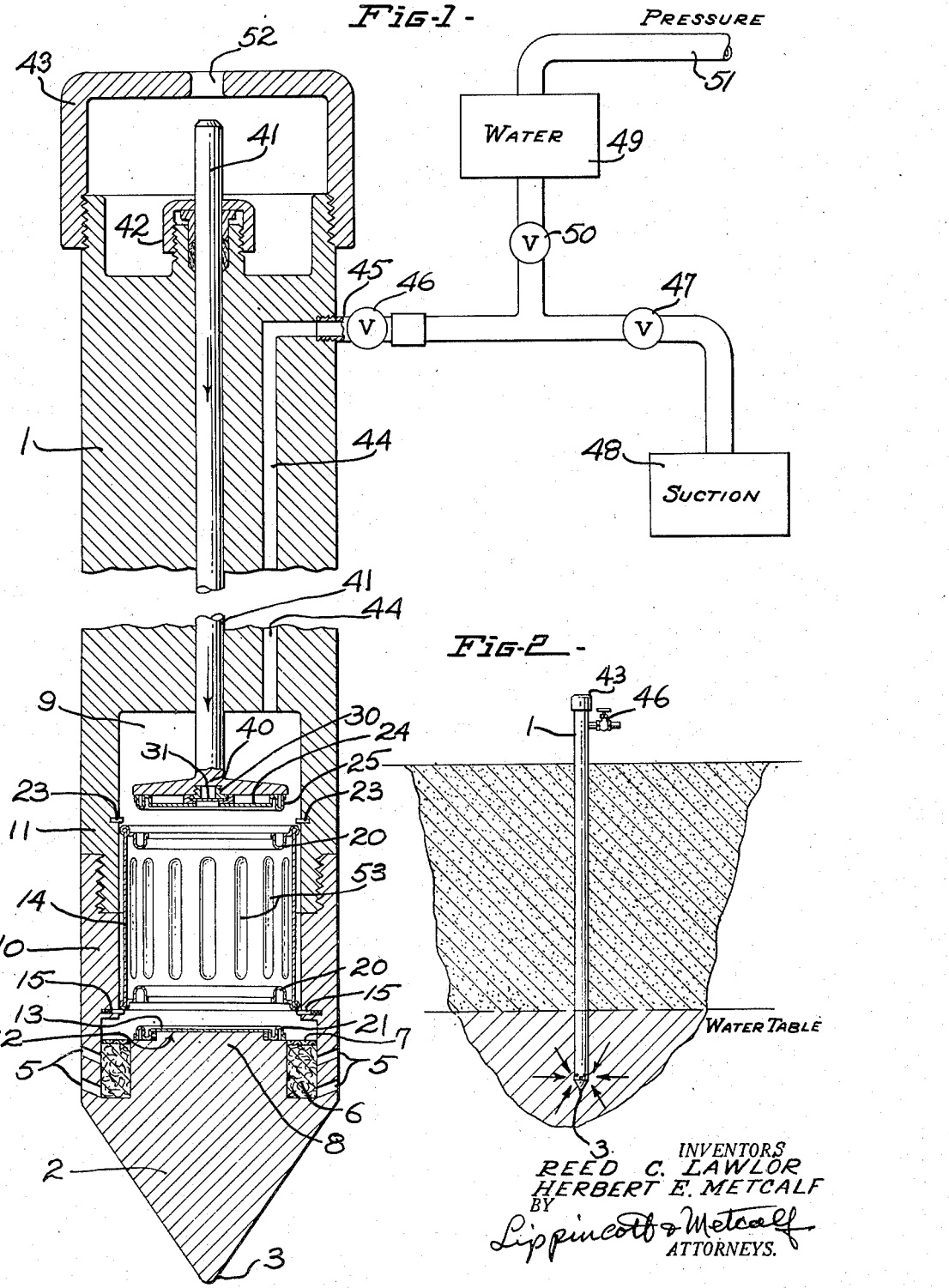
INVENTORS
REED C. LAWLOR
HERBERT E. METCALF
BY
Lippincott & Metcalf
ATTORNEYS.

May 22, 1945. R. C. LAWLOR ET AL 2,376,366
GEOCHEMICAL PROSPECTING SYSTEM
Filed June 17, 1940   3 Sheets-Sheet 2
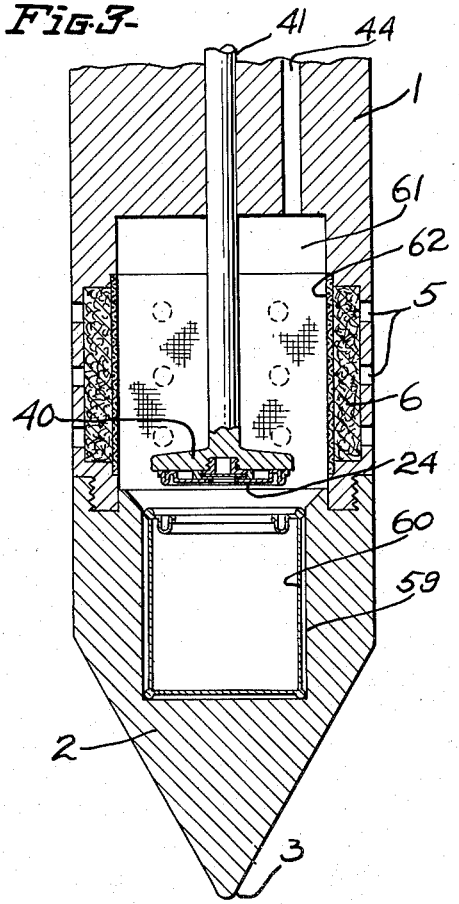
Fig. 3-
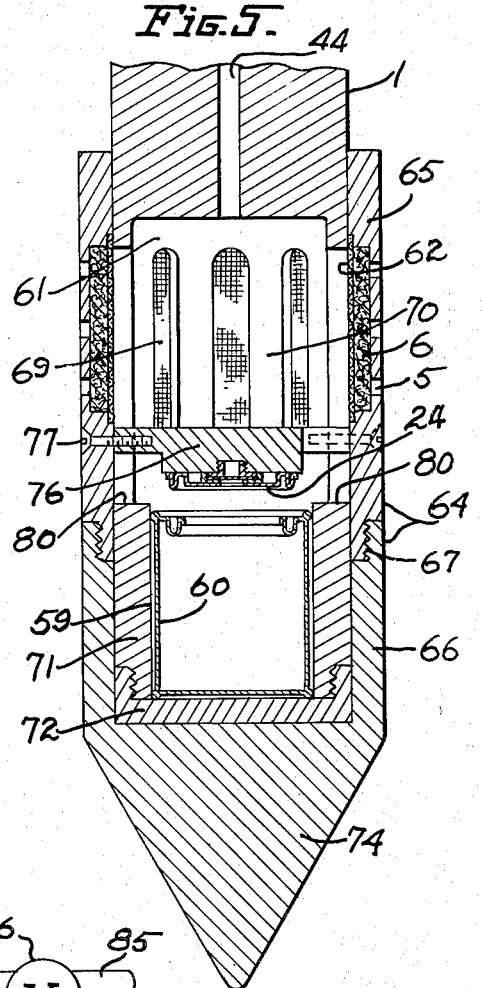
Fig. 5-
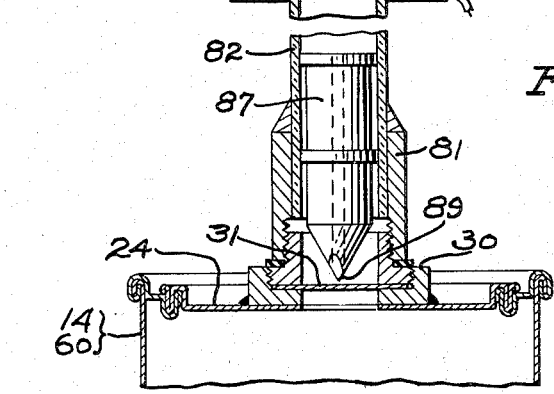
Fig. 4-
INVENTORS
REED C. LAWLOR
HERBERT E. METCALF
BY
Lippincott & Metcalf
ATTORNEYS.

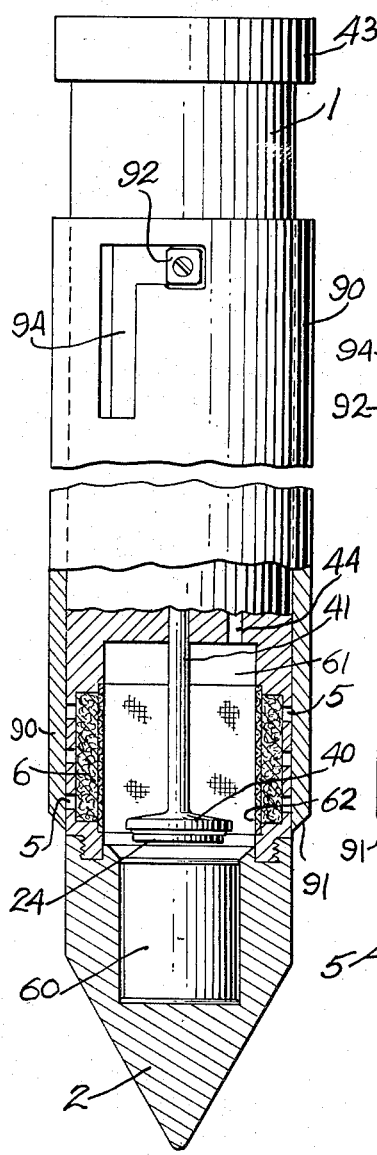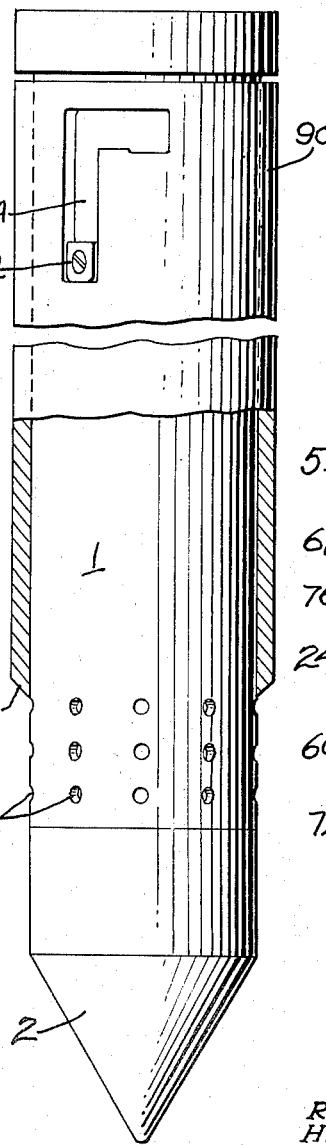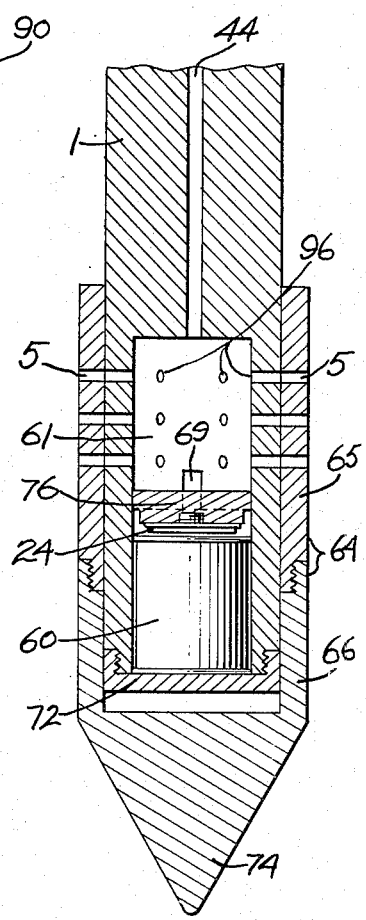

Patented May 22, 1945

2,376,366

UNITED STATES PATENT OFFICE 2,376,366

GEOCHEMICAL PROSPECTING SYSTEM

Reed C. Lawlor, Pasadena, and Herbert E. Metcalf, San Francisco, Calif., assignors, by direct and mesne assignments, to Consolidated Engineering Corporation, Pasadena, Calif., a corporation of California Application June 17, 1940, Serial No. 341,004

2 Claims. (Cl. 23—232)

Our invention relates to geochemical prospecting and more particularly to a system ideally adapted for upper layer prospecting to determine the existence of subterranean petroliferous deposits.

Among the objects of our invention are: To systematically prospect an upper or surface layer of the earth to determine the existence of petroliferous deposits in deeper layers; to provide a geochemical prospecting system using liquid samples; to provide a means and method of obtaining liquid samples for use in geochemical prospecting; to provide a means and method of obtaining liquid samples from beneath the surface of the earth; to provide a means and method of obtaining liquid samples at a depth below the surface of the earth, with sealing of said samples before withdrawal to the surface of the earth; to provide a means and method for taking and sealing liquid samples in situ in the soil; to provide a means and method of draining a volume of soil beneath the earth's surface, of at least a portion of its contained liquid; and to provide a geochemical prospecting system based on the analysis of systematically collected liquid samples obtained below the surface of the earth, without depending on fortuitous exposures of natural underground flows.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

In December, 1923, the United States Bureau of Mines, under the auspices of the United States Department of the Interior, published an investigation report, Serial No. 2553, entitled "Gaseous Content of Ground Waters as an Aid to the Petroleum and Natural Gas Prospector", this article being written by G. W. Jones, W. P. Yant, and E. P. Buxton, at that time working for the Bureau of Mines, Department of the Interior. The authors set forth the premise that if exposed water has traversed a gas or oil sand it will absorb a definite quantity of hydrocarbon vapor and will carry these vapors to the surface exposure of such water. They therefore made an extensive investigation and analysis of existing exposed flowing and well waters from various States, samples from these waters being taken wherever available over areas where oil deposits were known to be below or adjacently below, and also taken from exposed waters over areas where no oil had ever been reported. They analyzed gases expelled by treatment from well and spring water samples for the determination of $CO_2$, $O_2$, $CH_4$, $C_2H_6$, and $N_2$, and demonstrated that waters taken from wells near Pennsylvania producing regions, did show evidence of having therein gases significant of the presence of petroliferous deposits. These samples were not systematically collected but were scattered, inasmuch as they were taken solely from exposed water in ponds, shallow springs, water wells, and similar open water concentrations, and no attempt was made by them to determine whether or not hydrocarbon gases existed elsewhere than in exposed waters.

No known attention was paid to the above-identified investigations by workers in the petroleum art, probably because of the fact that analyses of water samples from existing open sources could not be satisfactorily correlated to outline or determine any underlying oil deposit, as open sources do not exist in systematically located patterns. Consequently, workers in the petroleum prospecting field turned to other means and methods of geochemical prospecting, such as the actual withdrawal of gas alone from holes bored in the ground as exemplified by the Laubmeyer Patent, No. 1,843,378, or to the analysis of gas entrained in soil and dirt samples as exemplified by the Rosaire and Horwitz Patent, No. 2,192,525.

We have found, however, that hydrocarbon gas which diffuses and migrates upwardly from underlying petroliferous deposits may be contained in water which is a part of an unexposed soil volume and which can be aspirated from wet soil, and that water alone so obtained can be used for analysis, correlation, and study for petroleum prospecting purposes with the great advantage that no corrections need be made for any so-called adsorptive factors of the soil itself. We have therefore provided a means and method of geochemical prospecting which completely differs from the Laubmeyer and Rosaire et al. methods, but which greatly improves and makes practical the broad underlying idea of the early investigations of the Bureau of Mines, in that we have provided a means and method of abstracting or aspirating water from the soil in situ, anywhere, without necessary resort to the fortuitous occurrence of open wells, springs, or ponds, thus obtaining water samples which represent the hydrocarbon content of the soil in an undisturbed soil volume much greater than would ordinarily be obtained in a soil sample. Our invention goes further and encompasses the use of other liquids than water.

Furthermore, our means and method is not subject to the great deficiencies of the Bureau of Mines' method, because our samples need not be taken from preexisting open waters but which comprise water which has been more or less static in position in and around relatively undisturbed particles, thereby having had time to thoroughly absorb gases diffused from lower deposits, if present. The use of water samples only entirely eliminates the need of determining the adsorptive ability of the soil as set forth by Bays in United States Patent No. 2,165,440.

We have also found that in case sufficient water cannot be initially extracted or aspirated from the soil in situ, we are able to wet the soil around the area from which we extract samples and allow this injected liquid to pick up the hydrocarbons in the too dry soil for predetermined times, and then aspirate at least a portion of this introduced liquid to use as a sample. This liquid may be water or other solvents known to have an affinity for hydrocarbons or other significant constituents sought for. Before aspirating from the soil the solvent which has been injected thereinto, the solvent should be maintained in the sampling position sufficiently long for it to absorb hydrocarbons or other constituents significant of an underlying petroleum deposit in amounts characteristic of the relation of the respective sampling positions to the deposit. Preferably the solvent should remain in the position long enough to reach equilibrium with its environment, that is long enough to absorb the maximum amount of the hydrocarbon or other constituent which it is capable of absorbing at the particular sampling position.

We prefer to take our samples at uniform depths below the water table wherever possible, and in case such uniform depth sampling is not feasible, correction is made for sampling depth below the top of the water table. Data for such corrections may be obtained by measuring the vertical hydrocarbon concentrations at a number of points in the area under investigation to establish a reference gradient. Such vertical gradient may be obtained from samples also taken by the means and method herein described and claimed. We further prefer to seal our samples before raising the samples to the surface, thus preventing any loss of gas by handling or release of pressure.

We have found that liquid samples taken in the manner above described from wet or moist soil in situ can give an accurate reproducible prospecting record and thus can be relied upon to give accurate correlations when a plurality of samples are taken over an area at systematically located and recorded points, using the same apparatus and the same controlled procedure.

Our invention may be more readily understood by direct reference to the drawing.

Fig. 1 shows a preferred form of sampling device in a longitudinal sectional view, together with schematic pipe connections desirable to operate the device.

Fig. 2 is a diagram showing how the sampling pipe may be inserted into the earth.

Fig. 3 is a longitudinal sectional view of the nose of a modification of our invention.

Fig. 4 is a view, partly in section and partly in elevation of a sample container attached to the beginning of a gas analysis system.

Fig. 5 is a longitudinal sectional view of a third modification of our invention.

Fig. 6 is a view, partly in elevation and partly in section, showing a liquid excluding shield as applied to the rod shown in Fig. 3.

Fig. 7 is a view similar to Fig. 6, showing the inlet apertures exposed.

Fig. 8 is a sectional view showing how liquid may be excluded, when desired, from the modification shown in Fig. 5.

Referring to Fig. 1 for a more detailed description of the first embodiment of our invention, an elongated sampling rod is provided at one end thereof with a pointed nose 2. This pointed nose 2 has a sharp apex 3 so that the sampling assembly may be readily driven into the ground, if desired, and the rod 1 just above nose 2 is provided with apertures 5. Apertures 5 lead into an interior space filled with a filter material 6, such as mineral or glass wool, for excluding soil and is held in place by annular screen 7. Filter 6 surrounds a central boss 8 which may be, if desired, an extension of sharpened point 3. Screen 7 opens into a hollow container chamber 9; this operating chamber being opened by unscrewing tip portion 10 from main body portion 11 of the rod 1. Boss 8 is provided with an upper seat 12, to which a lower can cover 13 is frictionally applied. A sample can 14 is inserted into chamber 9 and retained in place by spring retainers 15, this can being preferably elongated to hold down the overall diameter of the sampling device; other shapes are, of course, optional. The sample can 14 is preferably similar to a standard paint can but has two open ends, each end being provided with a groove 20, the lower groove registering frictionally with rim 21 of the lower can cover 13. The sample can 14 is held as to its upward position by retaining pins 23.

Immediately over the upper end of can 14 is positioned an upper cover 24, this cover also being provided with a friction rim 25 and differing from the lower cover in that it is provided with a central fitting 30 having a diaphragm 31 therein closing an aperture in the cover. This type of can and cover is described and claimed in United States Letters Patent No. 2,325,057, issued July 27, 1943, to Hoover and Metcalf.

The central fitting 30 is screwed into a sealing head 40, this sealing head being supported by an operating rod 41 extending upwardly the entire length of the rod 1 and emerging from the upper end thereof through a stuffing box 42. The end of the operating rod 31 is protected by a driving cap 43 by which the entire sampling device may be driven into the ground, without moving operating rod 41. If desired, operating rod 41 may be threaded to rod 1. Thus, it will be seen that can 14 with its covers 13 and 24 are all positioned in co-axial relationship and that both covers are maintained spaced from the can to allow water passage therebetween.

Container chamber 9 is connected with upper end of the sampling rod by a bore 44 terminating on the side of the device in fitting 45, to which may be attached a valve 46. Fitting 45 is connected through a vacuum valve 47 to a vacuum pump or other suction device 48, and to a supply of water through a water valve 50, the water in supply 49 being controlled by pressure line 51 connected to any convenient source of pressure, such as an air pump.

The operation of the device to take a water sample is simple. The end including portions 2 and 10 is unscrewed from the remainder of the sampling rod and lower can cover 13 is pressed on seat 12. Then the upper can cover 24 is positioned on sealing head 40 and the rod 41 is moved upwardly to space upper cover 24 from the upper opening of the can when container 14 is in proper position. Container 14 is then placed in the device and end rescrewed to the body of the sampling rod. The entire device is then driven or otherwise progressed into the ground. After having been set at a proper depth as determined by the general characteristics of the area to be prospected, suction may be applied to container chamber 9 through bore 44 with water valve 50 closed. If it is found that the underground soil being prospected contains sufficient water to cause some of this water to be aspirated from the soil adjacent apertures 5, then this water will flow into central space 9 to rise into container 14, the soil being excluded by filter 6. After the proper length of time, operating rod 41 is forced downwardly by pressure on rod 41 through a cap aperture 52. Downward movement of rod 41 first forces container upper cover 24 against the top of can 14; continued pressure forces container 14 past spring retainers 15 and allows can 14 to be progressed downwardly until the lower portion of the can contacts lower cover 13. Additional pressure then firmly seals the rims 21 and 25 of the covers in grooves 20 of the can, thus completely sealing the water sample. In case water is sufficiently plentiful so as to fill container 14 completely, we may desire to provide the container with corrugations 53 which permit expansion during sealing. The sampling device may then be withdrawn from the ground and the sealed can removed, labeled, and recorded as to location on a map of the area being prospected, and the sealed sample taken into the laboratory for analysis for hydrocarbon gases that are significant of underlying petroliferous deposits, such as for example ethane and methane.

It should be noted that while we have described the use of suction to aspirate water from the soil into the sample container in situ, there are many soils where an artificial suction need not be supplied, as for example when there is sufficient water in the soil so that the water will flow into the sample container simply by opening bore 44 to the atmosphere. We have also provided means for obtaining samples from soils where there is not sufficient water available to flow into the sample container, by first opening valve 50 and by putting pressure on the water supply 49, thus forcing water out of the supply 49 into the soil. We leave this water in the soil for a predetermined time and then aspirate at least a portion of the water back into the container 14. The water returning to container 14 will bring with it gas and water which was in and around the soil particles, and thus provide a sample which has a hydrocarbon content, if such a hydrocarbon content is available in the particular soil being sampled. The sample is then sealed as before. Other liquids having a special affinity for significant soil constituents may be substituted for the injected water.

In Figs. 3 and 5, we have shown modifications using a container 14 open at one end only, these modifications being adapted for use in wet soils only. In the modification shown in Fig. 3, the pointed nose 2 of the sampling rod is provided centrally with a container chamber 59 in which a single-opening container 60 is fitted with the open end extending upwardly. Operating rod 41 holds a can cover 24 as in the modification shown in Fig. 1. In the side walls of rod 1, immediately above the level of container 60, is a cylindrical filter chamber 61 which is lined with cylindrical screen 62 to retain filter material 6 between screen 62 and water apertures 5. Pointed nose 2 is removable for reloading by being threaded to rod 1, as in the former modification described.

The operation of the device shown in Fig. 3 is similar to that shown in Fig. 1. The pointed nose 2 is unscrewed, the can and cover loaded into the device, and the pointed nose 2 replaced. The device is then driven or otherwise forced into the ground to the proper depth, and appropriate suction applied. After the proper time has elapsed, the operating rod 41 is forced downwardly to cap and seal container 14, and the device may then be withdrawn for the removal of the sealed container and for refilling.

In Fig. 5, we have shown a modification which requires no operating rod 41. In this case, the main body of the sampling rod 1 is provided with a sliding end 64. This sliding end 64 comprises two portions, a hollow cylinder portion 65 fitting around rod 1 and a lower pointed end portion 66, the two being separable on threads 67.

The suction chamber 61 is in rod 1 and is provided with longitudinal apertures 69, these apertures forming longitudinally extending bars 70 connected with a hollow end piece 71. Hollow end piece 71 is provided with a container cavity 59, in which container 60 may be positioned by removal of end plate 72.

Can cover 24 is supported on a cross member 76, which is fastened to cylindrical portion 65 by screws 77, the lateral portions of cross member 76 extending through apertures 69 in main body 1. Liquid apertures 5 are provided in the walls of cylinder portion 65 backed by filter 6 held in place by screen 62, all mounted on cylindrical portion 65, so that liquid from the outside soil may pass through rod apertures 5 through filter 6, screen 62, and then through longitudinal apertures 69 into chamber 61, to fall by gravity into container 60.

In operation, this particular modification is loaded with the container 60 by first unscrewing pointed end portion 66 from cylindrical portion 65. Plate 72 is then unscrewed and the can cover 24 positioned on cross-member 76. Container 60 is then loaded into the end piece 71 and plate 72 is screwed on. The pointed end portion 66 is then screwed on cylindrical portion 65 and the device is ready to be driven or forced into the ground.

As the device is being forced into the ground, the sliding end 64 is forced upwardly to the end of sampling rod 1 maintaining the can and cover apart until the required depth has been reached. At that time suction is applied to liquid chamber 61 through bore 44 and liquid will enter into chamber 61, there to fall into container 60 by gravity. After the device has been left in the soil a proper length of time, the sampling rod is pulled from the soil by upward pressure on the top thereof, and, during the first upward movement thereof, there will be relative movement between the main body of rod 1 and the sliding end 64 inasmuch as the sliding end 64 will tend to remain stationary in the soil. The first portion of this relative movement will cause the container 60 to be forced against cover 24, and to make a friction seal thereto. Further upward motion of the body portion 1 will cause the upper shoulders 80 of end piece 71 to engage cross-member 76. This engagement carries the sliding portion 64 upwardly along with the main body of the sampling device and the sealed can will be brought to the surface where it can be removed, labeled, recorded, and set aside for future analysis and a new can placed in the device.

The modifications shown in Figs. 3 and 5 are not well adapted to be used with water injection, inasmuch as it will be obvious that if liquid is forced downwardly through bore 44 and out into the soil, container 14 will become filled with this liquid and upon aspiration the sample, coming back into the sampling device, will not be deposited in the container as it would be full. However, we find that the modification shown in Figs. 3 and 5 to be well adapted for the obtaining of samples from soil having sufficient water to be aspirated into the device directly.

In very wet soils it may be desirable to maintain a positive pressure in bore 44 to prevent water from entering the container during the insertion of the sampling rod in the soil and until it has reached the proper depth. At that time, the positive pressure may be removed and the negative pressure applied as described.

In Figs. 6 and 7, we have shown positive means for preventing water from entering the container during the insertion of the sampling rod in the soil, or until desired. In this case, we provide rod 1 with a cylindrical shield 90 having a beveled lower end 91, surrounding apertures 5. This cylindrical shield is free to slide up and down on rod 1 and the upper end thereof may reach to the surface of the ground. When it is desired that apertures 5 be covered, the shield is maintained in position covering these apertures by lug 92 on rod 1, this lug being positioned in the horizontal portion of an L-shaped slot 94 at the top of the shield 90. When, however, it is desired that the apertures 5 be exposed for the aspiration of liquid into the container, the rod is rotated relative to the shield until the lug registers with the vertical portion of slot 94 in the shield, whereupon the rod may be progressed further into the ground leaving the shield stationary, thus exposing apertures 5, as shown in Fig. 7. If it is desired to close the apertures before the rod is fully removed, the pulling pressure may be applied to rod 1 only, thus moving the rod with relation to the sleeve 90 to close the apertures. In this position lug 92 will bear against upper portion of slot 94 and both of them will be pulled together thereafter.

In Fig. 8, we have shown a modification of the aperture arrangement in a device operating similarly to the modification shown in Fig. 5. Here cross member 76 secured to sliding end 64 extends through slots 69 to allow relative vertical movement; but these slots are wholly disconnected from apertures 5 in the walls of the sliding end 64, at all times. Separate internal apertures 96 are provided and entrance of liquid into container cavity 61 can only occur when internal apertures 96 register with external apertures 5. This registry will exist only when rod 1 has been partially raised, sliding within end portion 64 and before cover 24 is sealed to container 60. The apertures are so shown in Fig. 8. When the sliding end 64 is bedded solidly against the end plate 72 of rod 1, the apertures are closed. This occurs when device is being driven into the ground. The first relative movement of the rod and the sliding end opens the apertures, and the final movement seals the container. It should also be pointed out that the same registry and sealing of apertures can be accomplished by turning rod 1 with respect to sliding portion 65—66 and widening slots 69 to permit the rotary movement In Fig. 4, we have shown the means by which the sealed and filled containers may be attached to a gas analysis device. Fitting 30 containing diaphragm 31 is screwed to a system fitting 81 which is sealed to a vertical tube 82, the latter dividing at the top into a tube 83 going to a gas analysis apparatus under control of valve 84 and to a vacuum pump or similar device through tube 85 under control of valve 86. Vertical tube 82 contains a sliding weight 87 having a pointed lower end 89 sharpened to puncture diaphragm 31 when dropped thereon. This weight 87, being preferably of magnetic material and liftable to an upper position by surrounding it with slidable solenoid 90, energizing the solenoid to attract weight 87, and lifting weight 87 by lifting the solenoid. In the upper position the solenoid may be deenergized to cause the weight to drop. The sharpened end 89 punctures the diaphragm and gas will then be admitted to tube 82. Weight 87 has a vertical bore therein to facilitate the passage of gas from the container 14 or 60 to gas analysis apparatus connected to tube 83. Prior, however, to the puncture of diaphragm 31, tube 82 is preferably pumped out by the action of the vacuum pump with valve 84 closed and valve 86 opened, after which valve 84 is opened while valve 86 is closed. If the gas analysis apparatus be held at a reduced pressure and valve 84 be maintained open gas from the water sample contained in container 14 or 60 may be released into the gas analysis apparatus under the influence of such treatment as may be necessary to release the gas from the water, such as, for example, a heat treatment. The gas released from the water sample may then be analyzed in known ways, for the presence of hydrocarbons such as, for example, the combustion method outlined in the Bureau of Mines article cited supra, by the use of the Hertz diffusion apparatus, or by the use of a mass spectrometer as set forth in the copending application of Washburn & Taylor, Serial No. 320,802, filed February 26, 1940.

The water samples can be analyzed for any of the following:

(a) Light hydrocarbons which have migrated or diffused from a petroleum deposit;

(b) Chemicals derived from migratory constituents by catalytic action of the soil and other natural forces;

(c) Any significant constituent that follows the same path as the hydrocarbons;

(d) Any migratory constituent significant of underground mineral deposits.

(e) Concentrations of hydrocarbons or other constituents.

After the analysis has been made, the results are noted and correlated with other results obtained to endeavor to outline, on the map record kept, patterns, concentrations, contours, or gradients in terms of significant gas content or other significant constituents, which will indicate the presence or absence of a subterranean deposit.

It should be pointed out that while we have described our device as being driven into the ground, it can also be used when a pilot hole is first provided so that the sampling device can be lowered into this hole for operation. It should also be pointed out that the device may be provided at its lower end with cutting edges and used as a rotary cutter so that it may form its own bore. All of these expedients are deemed to be full equivalents of the device shown.

We may exclude pilot hole water by lowering the sampling rod nose to the bottom of the pilot hole, excluding water during the lowering by the use of a sleeve as described above, and then drive or force the nose alone beyond the pilot hole bottom until the inlet apertures are in direct contact with soil alone.

We have found that there is a great advantage to withdraw soil liquids into the sample container, as outlined above. Obviously, the container will collect more liquid than would normally be held in a portion of soil of container size, as the liquid will migrate to the sample container from distances in the soil which will be more or less dependent upon the time the device is in operation before sealing. Thus, we are able to obtain samples having therein water concentrated from a large volume of earth of a size impractical to take as an actual dirt sample in widespread prospecting.

We have also found that the vacuum required for the aspiration of liquid from soils by our means and method is insufficient to release from the water samples any substantial amount of contained hydrocarbon gases.

We claim:

1. The method of geochemical prospecting which comprises placing an unsealed container at a substantial depth below the surface of the earth without substantial disturbance of the earth near the container, by a tool having provision for accommodating the container, and also for exhausting air from the container and subsequently sealing it, both from the earth's surface, thereby exposing the interior of the container to the surrounding soil, exhausting the air in the container to the earth's surface to aspirate liquids and gases from the soil into the container, then sealing the container by operation of said tool, then removing the tool and container to a position above the surface and then removing the aspirated liquids and gases from the container.

2. The method of geochemical prospecting which comprises driving into the earth to a substantial depth a tool carrying an unsealed container, without substantial disturbance of the surrounding earth, said tool having provision for accommodating the container and also for exhausting air from the container and subsequently sealing it, both from the earth's surface, thereby exposing the interior of the container to the surrounding soil, then exhausting the air in the container to the earth's surface by pumping means operated through the tool to aspirate liquids and gases into the container from the nearby earth, then operating the tool to seal the container, and then removing the tool with the sealed container from the earth.

REED C. LAWLOR.
HERBERT E. METCALF.